(12) United States Patent
Hodes et al.

(10) Patent No.: US 10,949,355 B2
(45) Date of Patent: Mar. 16, 2021

(54) METHODS AND APPARATUS FOR WORKLOAD BASED DYNAMIC CACHE CONTROL IN SSD

(71) Applicant: Western Digital Technologies, Inc., San Jose, CA (US)

(72) Inventors: Avichay Haim Hodes, Kfar-Ben Nun (IL); Oren Cohen, Tel Aviv (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 96 days.

(21) Appl. No.: 16/159,057

(22) Filed: Oct. 12, 2018

(65) Prior Publication Data

US 2019/0377681 A1 Dec. 12, 2019

Related U.S. Application Data

(60) Provisional application No. 62/683,482, filed on Jun. 11, 2018.

(51) Int. Cl.
*G06F 12/0846* (2016.01)
*G06F 12/0871* (2016.01)

(52) U.S. Cl.
CPC ...... *G06F 12/0871* (2013.01); *G06F 12/0848* (2013.01); *G06F 2212/1016* (2013.01); *G06F 2212/1036* (2013.01); *G06F 2212/222* (2013.01); *G06F 2212/282* (2013.01); *G06F 2212/601* (2013.01); *G06F 2212/604* (2013.01)

(58) Field of Classification Search
CPC ............ G06F 12/0246; G06F 12/0871; G06F 2212/222; G06F 2212/282; G06F 2212/502; G06F 2212/1016; G06F 2212/604; G06F 2212/7201; G06F 12/0848; G06F 2212/1036; G06F 2212/7204; G06F 2212/7203; G06F 2212/601
USPC ........................................................ 711/129
See application file for complete search history.

(56) References Cited

U.S. PATENT DOCUMENTS

| | | | | |
|---|---|---|---|---|
| 7,434,002 | B1* | 10/2008 | Zedlewski | G06F 11/3409 711/130 |
| 10,120,582 | B1* | 11/2018 | Farhan | G06F 3/0644 |
| 2013/0024609 | A1* | 1/2013 | Gorobets | G06F 12/0246 711/103 |
| 2014/0115235 | A1* | 4/2014 | Ito | G06F 12/0868 711/103 |
| 2016/0041778 | A1* | 2/2016 | Li | G06F 3/061 711/114 |
| 2019/0356731 | A1* | 11/2019 | Bivens | H04L 41/5009 |

* cited by examiner

*Primary Examiner* — Hashem Farrokh
(74) *Attorney, Agent, or Firm* — Loza & Loza, LLP; Gabriel Fitch

(57) ABSTRACT

Aspects of the present disclosure provide various apparatus, devices, systems and methods for dynamically configuring a cache partition in a solid state drive (SSD). The SSD may include non-volatile memory (NVM) that can be configured to store a different number of bits per cell. The NVM is partitioned into a cache partition and a storage partition, and the respective sizes of the partitions is dynamically changed based on a locality of data (LOD) of the access pattern of the NVM.

14 Claims, 7 Drawing Sheets

METHODS AND APPARATUS FOR WORKLOAD BASED DYNAMIC CACHE CONTROL IN SSD

PRIORITY CLAIM

This application claims priority to and the benefit of Provisional Patent Application No. 62/683,482, filed in the United States Patent Office on Jun. 11, 2018, the entire content of which is incorporated herein by reference as if fully set forth below in its entirety and for all applicable purposes.

FIELD

The present disclosure, in various embodiments, relates to non-volatile memory (NVM) devices and memory controllers for use therewith. More specifically, the present disclosure relates to approaches for dynamically configuring a cache storage based on a workload of an SSD to improve endurance and performance of the SSD.

INTRODUCTION

In a variety of consumer electronics, solid state drives (SSDs) incorporating non-volatile memories (NVMs) are frequently replacing or supplementing conventional rotating hard disk drives for mass storage. These non-volatile memories may include one or more flash memory devices, such as NAND flash memories, and the flash memory devices or cells may be logically divided into blocks with each of the blocks further divided into logically addressable pages. For example, a host device (e.g., a computing device) may provide a write command to the SSD for writing data to the SSD or a read command to the SSD for reading data from the SSD. An SSD may be implemented with various types of NAND flash memories, for example, single-level cell (SLC) type, multi-level cell (MLC) type, and quad-level cell (QLC) type. MLC type flash memory may store 2 bits per cell or 3 bits per cell (TLC type). QLC type flash memory may store 4 bits per cells. SLC and MLC type NANDs have higher performance (faster) and endurance (more reliable) than QLC type NAND. While SLC and MLC types NANDs store less data per cell than QLC type NANDs, SLC and MLC types provide for more program/erase cycles than the QLC type.

Some SSDs may be provisioned with NAND flash memories that can be dynamically configured to operate as SLC, MLC, or QLC type cells during SSD operations. In general, a majority of the flash memories may be operated as QLC or TLC type NANDs to provide a main data storage, and other flash memories may be operated as an SLC type NANDs to provide a cache partition to increase SSD performance and endurance. However, the size of the cache is typically fixed and may not be optimized for all potential data usage patterns of the SSD. That is, the fixed cache partition may be too small or too large for different users who may have different data usage patterns.

SUMMARY

One aspect of the present disclosure provides a non-volatile memory (NVM) controller configured to communicate with an NVM device. The NVM controller includes an access pattern determination circuitry configured to determine an access pattern of the NVM device by a host. The NVM controller further includes a locality of data (LOD) determination circuitry configured to determine a LOD of the access pattern. The LOD indicates a logical block address (LBA) range with a predetermined hit and miss (H/M) rate. The NVM controller further includes a NVM partition circuitry configured to dynamically configure data storage cells of the NVM device into a cache partition and a storage partition based on the LOD. The data storage cells of the storage partition are configured to store a greater number of bits per cell than the data storage cells of the cache partition.

One aspect of the present disclosure provides a solid state device (SSD). The SSD includes a non-volatile memory (NVM) and a controller operatively coupled to the NVM. The controller is configured to determine an access pattern of the NVM device by a host. The controller is further configured to dynamically configure data storage cells of the NVM device into a cache partition and a storage partition based on a locality of data (LOD) of the access pattern. The controller is further configured to adjust the size of the cache partition in response to a change of the LOD. The data storage cells of the cache partition are configured to provide greater endurance than the data storage cells of the storage partition.

One aspect of the present disclosure provides a method of operating a non-volatile memory (NVM) controller configured to communicate with an NVM device. The NVM controller receives commands from a host for accessing the NVM device and determine an access pattern of the NVM device by the host. Then the NVM controller dynamically configure data storage cells of the NVM device into a cache partition and a storage partition based on a locality of data (LOD) of the access pattern. The data storage cells of the cache partition are configured to provide higher performance than the data storage cells of the storage partition.

One aspect of the present disclosure provides a non-volatile memory (NVM) device. The NVM device includes means for receiving commands from a host for performing data operations with the NVM device. The NVM device further includes means for determining an access pattern of the NVM device by the host. The NVM device further includes means for dynamically configuring data storage cells of the NVM device into a cache partition and a storage partition based a locality of data (LOD) of the access pattern. Data storage cells of the storage partition are configured to use more threshold voltages per cell for storing data than the data storage cells of the cache partition.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Aspects of the present disclosure provide various apparatus, devices, systems and methods for dynamically configuring a cache partition in a solid state drive (SSD). As described herein, for example, the SSD may include non-volatile memory (NVM) that can be configured to store a different number of bits per cell. The NVM may be partitioned into a cache partition and a storage partition, and the respective sizes of the partitions may be dynamically changed based on a locality of data (LOD) of the access pattern of the NVM. The memory cells of the cache partition are configured to store fewer numbers of bits per cell than the cells of the storage partition. When the NVM is implemented with NAND memory cells, the memory cells of the cache partition may be configured as single-level cell (SLC) type or multi-level cell (MLC) type, and the memory cells of the storage partition may be configured as TLC or QLC type. SLC and MLC type cells have higher performance and endurance than TLC or QLC type cells. By dynamically adjusting the respective sizes of the cache partition and storage partition based on the access pattern, the SSD may have better endurance and higher performance. While the present disclosure will focus primarily on NAND memory technology, it should be understood by those skilled in the art that the teachings contained herein are also applicable to other similar forms of NVM. The examples described below use QLC type storage partition; however, the concept may be applied to other storage partitions with TLC type NAND memory cells.

Figure 1:
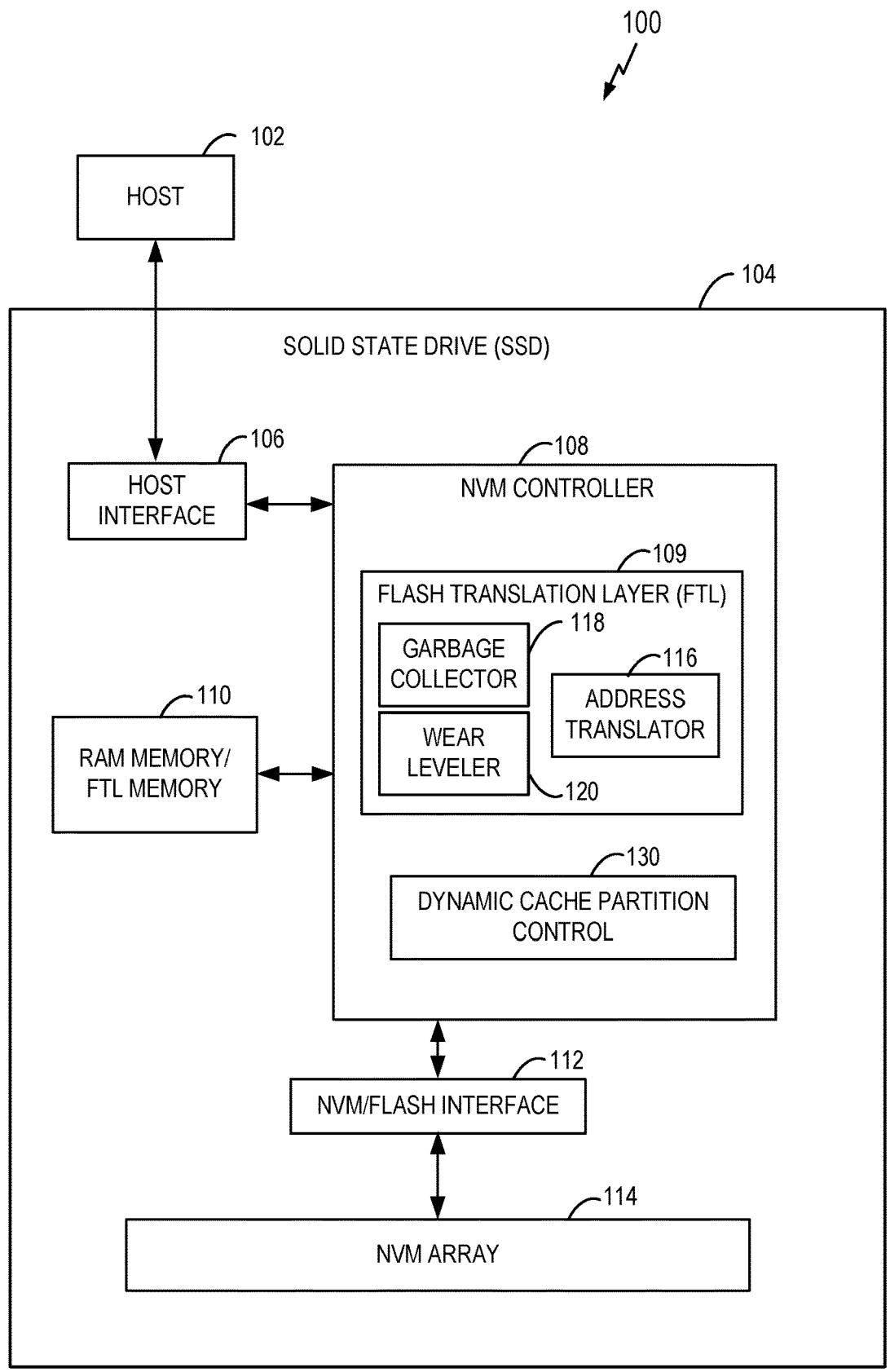
FIG. 1 is a block diagram of a system including an exemplary solid state device (SSD) in accordance with aspects of the disclosure.

FIG. 1 is a block diagram of a system 100 including an exemplary solid state device (SSD) in accordance with aspects of the disclosure. The system 100 includes a host device 102 and a SSD storage device 104 coupled to the host device 102. The host device 102 provides commands to the SSD storage device 104 for transferring data between the host device 102 and the SSD storage device 104. For example, the host device 102 may provide a write command to the SSD storage device 104 for writing or programming data to the SSD storage device 104 or read command to the SSD storage device 104 for reading data from the SSD storage device 104. The host device 102 may be any system or device having a need for data storage or retrieval and a compatible interface for communicating with the SSD storage device 104. For example, the host device 102 may a computing device, a personal computer, a portable computer, a workstation, a server, a personal digital assistant, a smartphone, a digital camera, or a digital phone as merely a few examples.

The SSD storage device 104 includes a host interface 106, a controller 108 (or alternatively, an NVM controller 108), which also includes a flash translation layer (FTL) 109, a RAM memory or FTL memory 110, a non-volatile memory (NVM) interface 112 (which may also be referred to as a Flash memory interface), and a non-volatile memory (NVM or NVM device) 114, such as a NAND Flash memory, for example. The host interface 106 is coupled to the controller 108 and facilitates communication between the host device 102 and the controller 108. Additionally, the controller 108 is coupled to the RAM memory 110 as well as the NVM 114 via the NVM interface 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host device 102 includes the SSD storage device 104. In other embodiments, the SSD storage device 104 is remote with respect to the host device 102 or is contained in a remote computing system communicatively coupled with the host device 102. For example, the host device 102 may communicate with the SSD storage device 104 through a wireless communication link.

The controller 108 controls operation of the SSD storage device 104. In various aspects, the controller 108 receives commands from the host device 102 through the host interface 106 and performs the commands to transfer data between the host device 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD storage device 104. In some aspects, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host device 102. In still further aspects, some or all of the functions described herein as being performed by the controller 108 may instead be performed by another element such as a controller in a hybrid drive including both non-volatile memory elements and magnetic storage elements.

The RAM memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), non-volatile random access memory, or the like. In various aspects of the disclosure, the controller 108 uses the memory 110, or a portion thereof, to store data during the transfer of data between the host device 102 and the NVM 114. For example, the memory 110 or a portion of the memory 110 may be a cache memory.

The NVM 114 receives data from the controller 108 via the NVM interface 112 and stores the data. The NVM 114 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage array, or the like.

In the example of FIG. 1, read requests may generally comprise a request from the host device 102 via the interface 106 to read the data within a given logical block address (LBA) associated with the NVM 114. Each logical block address is associated with a specific physical address within the NVM 114 through the use of the Logical to Physical (L2P) table maintained by the system controller 108, and more particularly by the FTL 109. In general, the table maps each logical block address to a physical block address within the NVM 114. The use of logical block addresses and a logical-to-physical block address conversion allows the controller 108 to effectively manage the memory within the NVM 114 and to implement various mapping and mechanisms, for example, partitioning the NVM 114 into different types or tiers to improve performance and endurance of the NVM 114.

In a further aspect, the FTL 109 may include an address translator 116 for effectuating the translation between logical and physical addresses, as well as to, in part, implement the L2P table. Furthermore, the FTL 109 may include a garbage collector process, module, or algorithm 118 that copies valid data into new or free areas and erases invalid data in physical block locations of the NVM 114 in order to free this invalid memory space. Still further, the FTL 109 may include a wear leveler process, module, or algorithm 120 used to ensure that erasures and re-writes are distributed evenly across the NVM 114.

Figure 2:
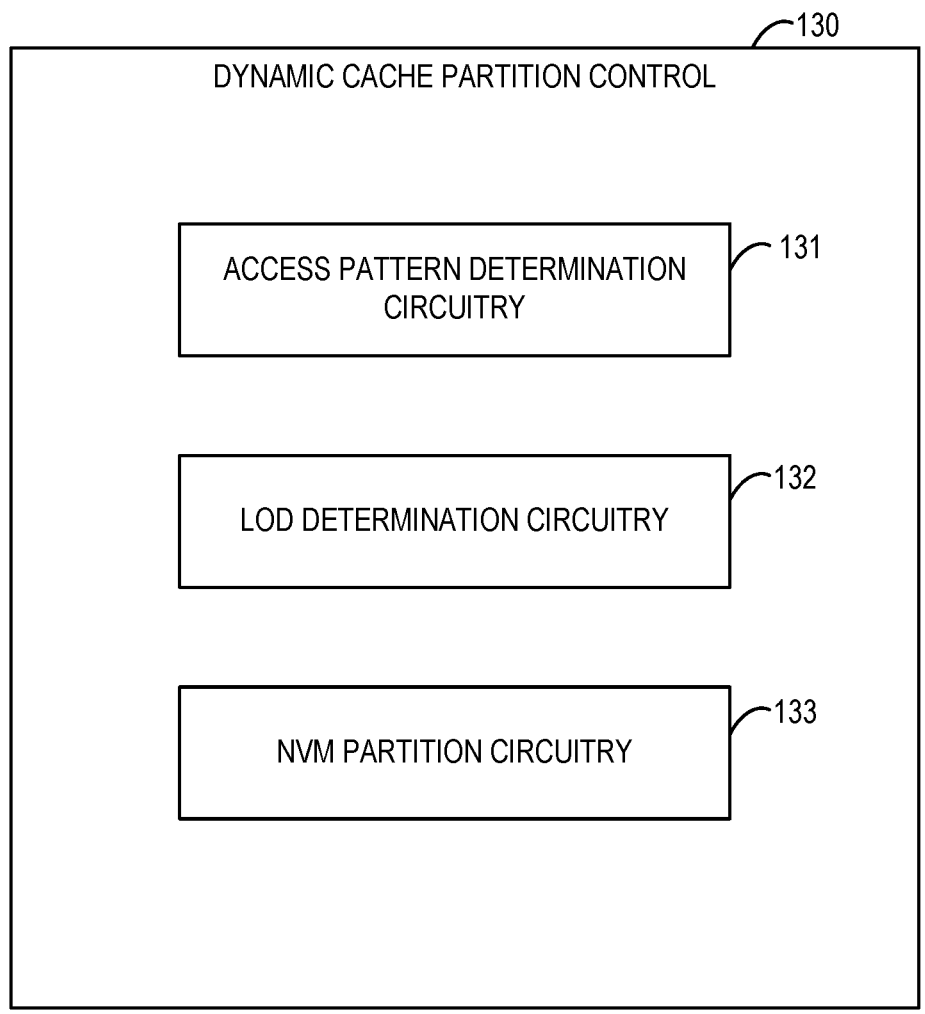
FIG. 2 is a block diagram of a dynamic cache partition control block of an NVM controller in accordance with aspects of the disclosure.

In a further aspect, the NVM controller 108 may include a dynamic cache partition control block 130 that may be implemented in software, hardware, firmware, or a combination thereof to perform various functions described below for configuring and operating a cache partition of the NVM 114. In one embodiment, referring to FIG. 2, the dynamic cache partition control block 130 includes access pattern determination circuitry (APDC) 131, LOD determination circuitry 132, and NVM partition circuitry 133. In cooperation with the host interface 106 and FTL 109, the access pattern determination circuitry 131 may be configured to determine an access pattern of the NVM device by a host. The access pattern may include the logical block addresses accessed by the host 102 during a certain time period. In cooperation with the host interface 106 and FTL 109, the LOD determination circuitry 132 may be configured to determine a LOD of an access pattern of the NVM 114. For example, the LOD may indicate a logical block address (LBA) range with a predetermined hit and miss (H/M) rate by the host within a certain time period. An exemplary method for determining the LOD is described in relation to FIG. 7 below. In some embodiments, other methods may be used to determine the LOD. The NVM partition circuitry 133 may be configured to dynamically configure data storage cells of the NVM 114 into a cache partition and a storage partition based on the LOD. In some embodiments, the data storage cells of the storage partition are configured to store a greater number of bits per cell than the data storage cells of the cache partition.

In some examples, the NVM 114 may include NAND-type flash memory cells that can be configured to store different numbers of bits per cell. For example, the memory cells of the cache partition may be configured to the SLC type or MLC type, while the other memory cells in a storage partition may be configured to the QLC type that stores more bits per cell than the SLC/MLC type.

In general, reading a NAND memory cell involves measuring the flow of electricity through the cell. One or more reference or read voltages are applied across the cell (e.g., source and drain electrodes) and the current across the cell is measured. An SLC type cell can store one bit per cell (two possible values) using one threshold voltage. An MLC type cell can store two bits per cell (four possible values) using three threshold voltages. A QLC type cell can store four bits per cell (16 possible values) using fifteen threshold voltages. Therefore, it takes longer to read or write QLC type cells than SLC/MLC type cells. While QLC type cells provide more data storage per cell, QLC type cells typically have worse endurance and performance than SLC/MLC type cells. On the other hand, SLC/MLC type cells have higher program and erase (P/E) cycles while offering lower bit density.

As SSD increases in capacity, NVM with higher bit density like QLC type NAND is frequently used as the data storage. However, QLC type cells have lower performance and less endurance than, for example, SLC/MLC type cells. In some designs, a portion of the QLC type cells may be configured to operate as SLC/MLC type cells that form a cache partition (SLC/MLC partition). When the NAND cells operate as SLC/MLC type cells, they have higher performance and endurance than the QLC configured cells. However, if the cache partition is fixed in size, it may not be optimally sized for all use cases or access patterns. In some examples, the SSD may dynamically reconfigure and resize the cache partition while ensuring the provisioned capacity of the SSD is available to the user under all conditions. However, this approach may result in unnecessarily frequent switching or folding of the cells between different tiers (e.g., QLC-to-SLC/MLC conversion).

Aspects of the disclosure provide a method for dynamically adjusting the SSD cache partition size according to a detected locality of data (LOD) in the access pattern of the SSD. In this disclosure, LOD refers to a logical block address (LBA) range in which most or all of the access pattern falls within a predetermined time period. A larger LOD indicates that the access pattern is spread widely across the NVM. To the contrary, a smaller LOD indicates that the access pattern is restricted to a smaller LBA range. Once the LOD is detected, the cache partition is accordingly adjusted in order to receive a higher rate of access and reduce access of the storage partition (e.g., QLC storage partition) that has lower performance and endurance. Therefore, by reducing access of the QLC storage partition and overloading the SLC/MLC cache partition, the endurance and performance of the SSD or NVM may be significantly increased. For example, when the cache partition is adjusted to handle all or most of user write access based on the LOD, the entire or most of endurance stress is placed on the SLC cache partition. Furthermore, when the SLC cache size is reduced based on the LOD, more NAND blocks may be used for the storage partition, thus enhancing the TLC or QLC cells endurance. In addition, dynamically sizing the cache partition based on the LOD results in a higher percentage of user access (read/write) contained within the cache partition that has faster read and write speed than the storage partition.

In the following illustrative examples, the cache partition has SLC type configured cells, and the main storage partition has QLC type configured cells. However, the same teachings and concept may be extended to other embodiments in which the cache partition uses other memory cells (e.g., MLC type) configured to increase performance and endurance of the SSD based on the detected LOD.

In some embodiments, the controller 108 may configure some flash memory cells, blocks, pages, and/or layers of the NVM 114 to operate as SLC type memory cells such that a certain portion of the total storage capacity of the NVM 114 is used as a cache partition. The cache partition (or referred to as SLC partition in the examples) provides faster data access to the NVM 114 and may store frequently used or accessed data. The rest of the NVM 114 may be configured to operate as slower QLC type memory cells that provide the main storage (or referred to as QLC partition in the examples). The creation of the SLC partition reduces the actual available capacity of the SSD or NVM. Therefore, when the NVM is getting full, the cache partition may be reduced such that the provisioned capacity of the SSD may be provided to the user or host as needed.

Figure 3:
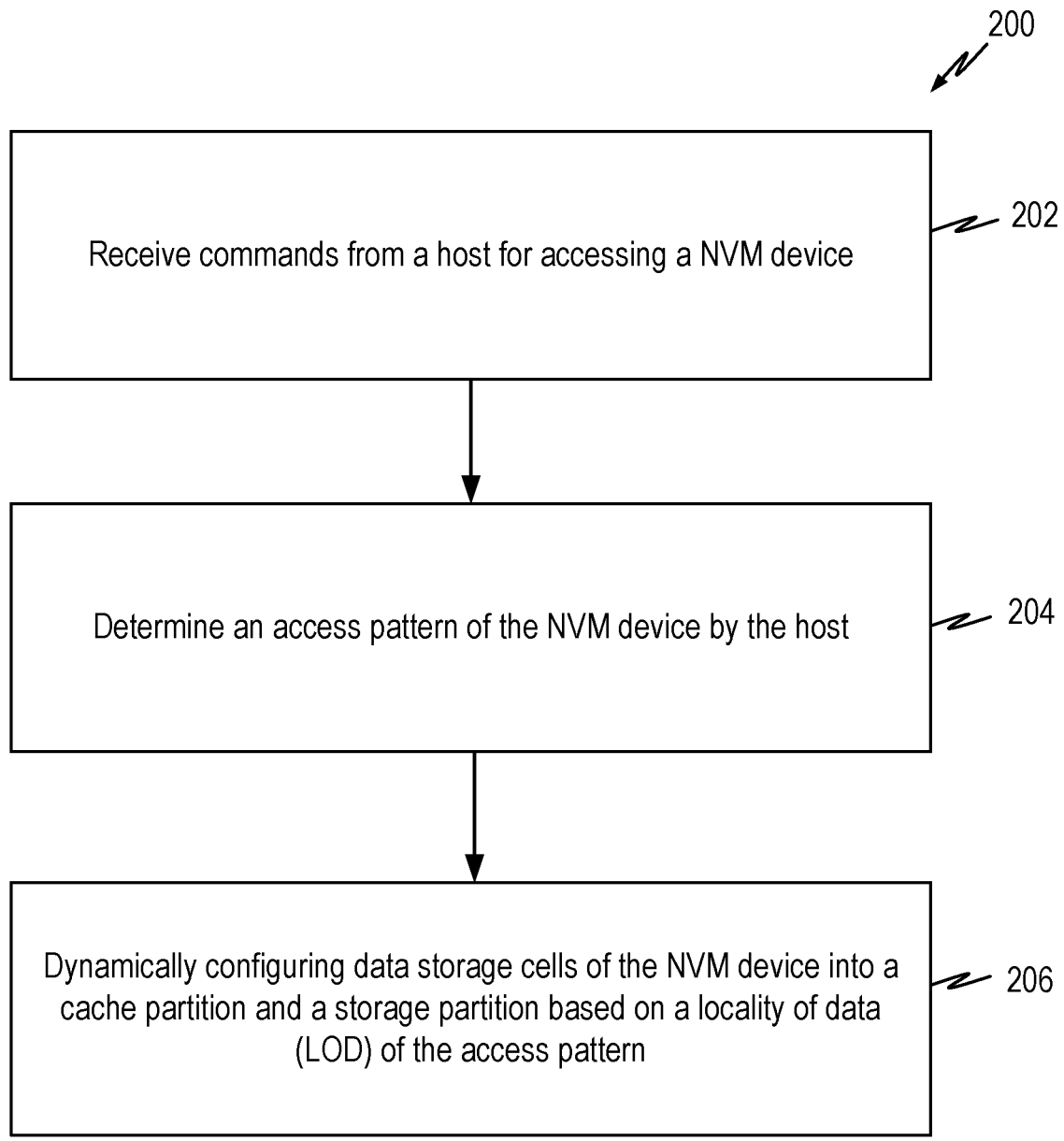
FIG. 3 is a flow chart broadly illustrating a method of operating a non-volatile memory (NVM) controller configured to communicate with an NVM device in accordance with aspects of the disclosure.

FIG. 3 is a flow chart broadly illustrating a method 200 of operating an NVM controller configured to communicate with an NVM device. In one example, the NVM controller may be the controller 108 of FIG. 1 or any device configured to control an NVM device. The NVM device may the NVM 114 or any non-volatile memory that may be dynamically configured into a cache partition and a data storage partition with different types or tiers of storage cells. In one example, the memory cells of the cache partition may be SLC/MLC type, and the memory cells of the data storage partition may be QLC type.

Referring to FIG. 3, at block 202, the controller 108 of SSD 104 may receive commands from the host 102 via the host interface 106. For example, the commands may include write commands for writing data to the NVM 114 and/or read commands for reading data from the NVM 114. The commands may include logical block addresses (LBAs) indicating the locations of the accessed data, and the controller may use the FTL 109 to translate the LBAs to the corresponding physical block addresses of the NVM such that data can be read or written from/to the NVM 114 via the NVM interface 112.

At block 204, the controller determines an access pattern of the NVM device by the host. The controller may use the dynamic cache partition control block 130 and/or the FTL 109 to determine the access pattern. The access pattern may include the LBAs accessed (e.g., read/write) by the host during a predetermined period of time. For example, the controller may save the LBAs accessed during the period in a buffer that may be stored in the RAM memory 110.

Figure 4:
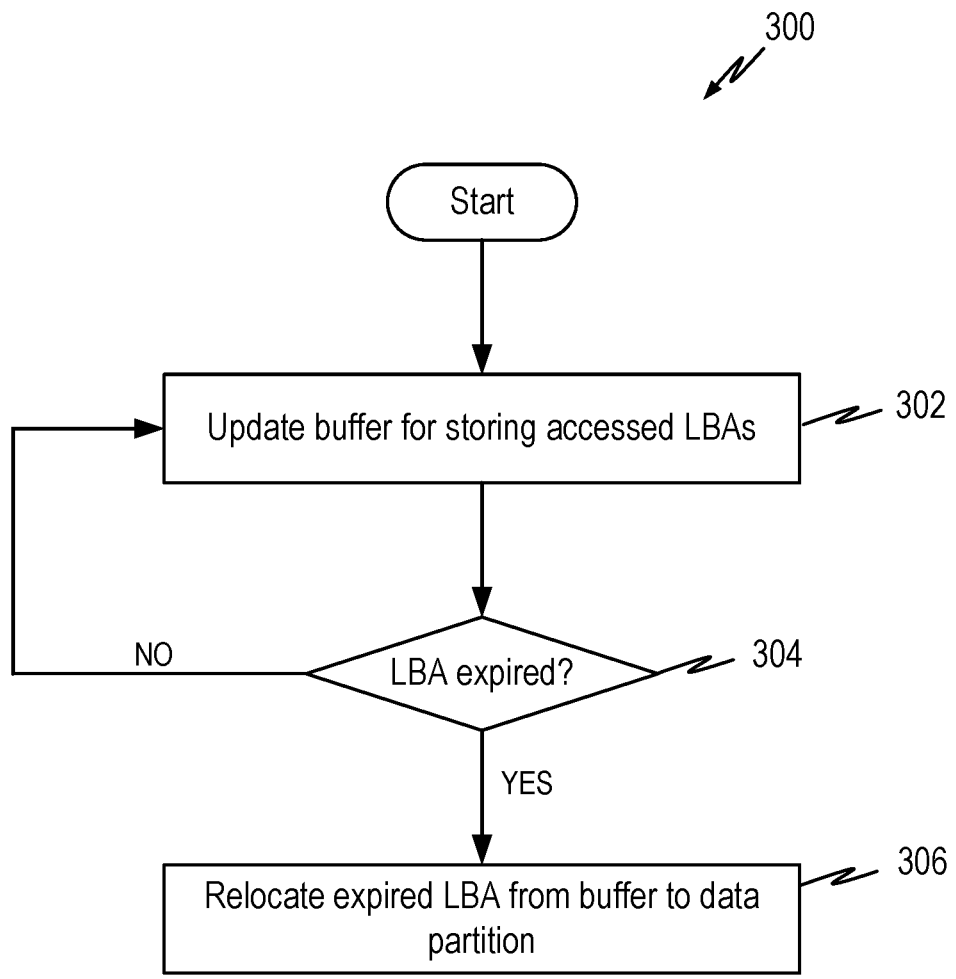
FIG. 4 is a flow chart illustrating a process for updating a buffer for storing logical block addresses of an access pattern in accordance with various aspects of the disclosure.

FIG. 4 is a flow chart illustrating a process 300 for updating a buffer for storing LBAs of an access pattern. At block 302, the controller 108 may update the buffer to store the LBAs that have been accessed recently or in a certain time period. Therefore, at decision block 304, the controller may decide whether any of the LBAs stored in the buffer has expired. For example, an LBA may be considered expired when the LBA has not been accessed recently for a predetermined time period. At block 306, the controller may relocate the expired LBA from the buffer to the storage partition or main storage. The controller may continue this process 300 to keep LBAs in the buffer up to date. The LBAs kept in the buffer may be used to determine a locality of data (LOD) of the access pattern.

Referring back to FIG. 3, at block 206, the controller 108 dynamically configures data storage cells of the NVM device into a cache partition and a storage partition based on a locality of data (LOD) of the access pattern. The controller may determine the LOD using, for example, the process 600 described below in relation to FIG. 7. In this disclosure, the LOD refers to an LBA range in which the access pattern of the NVM is significantly localized. That is, a larger LOD indicates that the access pattern is spread wider across the NVM 114. To the contrary, a smaller LOD indicates that the access pattern is restricted in a smaller LBA range.

Figure 5:
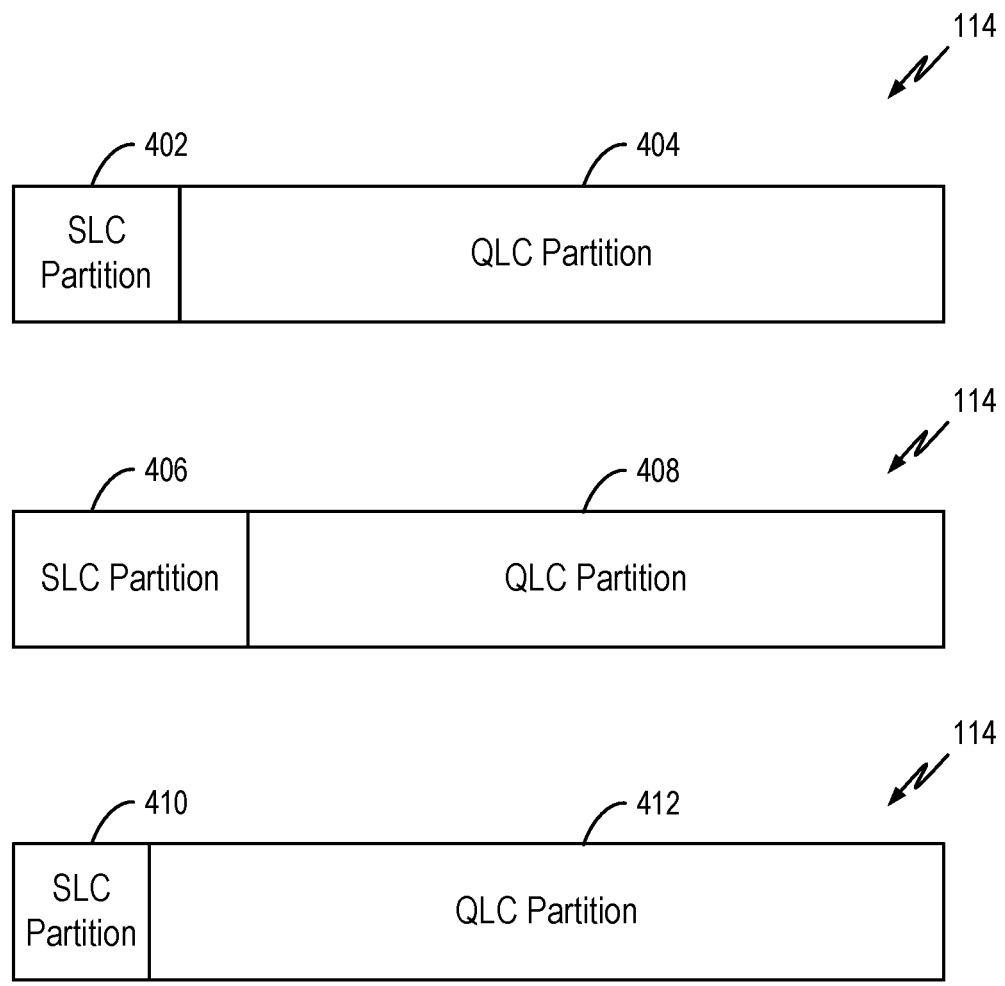
FIG. 5 conceptually illustrates exemplary configurations of a cache partition and a storage partition of an NVM in accordance with various aspects of the disclosure.

FIG. 5 conceptually illustrates exemplary configurations of a cache partition and a storage partition of the NVM 114. In these examples, the cache partition has SLC type cells, and the storage partition has QLC type cells. The memory cells of the cache partition when operated as SLC type cells, have higher performance and endurance than QLC type cells of the storage partition. In general, the storage partition is configured to store a greater number of bits per cell than the cache partition. Based on the LOD of the NVM 400, the controller may dynamically resize these partitions. In one example, when the LOD increases, the controller may increase the cache partition 402 to a larger cache partition 406 and decrease the storage partition 404 to a smaller storage partition 408. In another example, when the LOD decreases, the controller may decrease the cache partition 402 to a smaller cache partition 410 and increase the storage partition 404 to a larger storage partition 412. Because the use of the cache partition reduces the available storage capacity of the NVM, the size of the cache partition may be limited by the storage need of the host such that the NVM can provide the provisioned storage capacity to the host or user regardless of the cache partition size.

Figure 6:
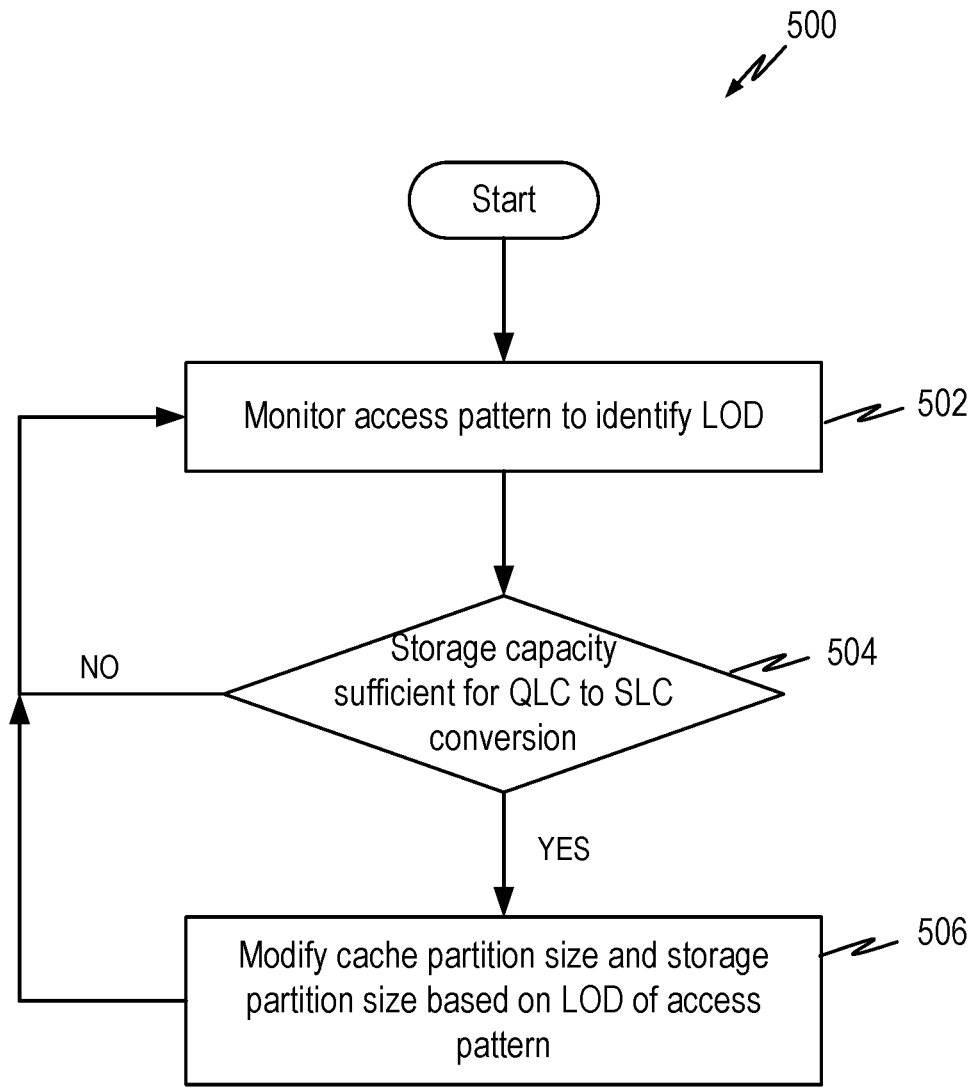
FIG. 6 is a flow chart illustrating a process for dynamically modifying a cache partition of an NVM based on a locality of data (LOD).

FIG. 6 is a flow chart illustrating a process 500 for dynamically modifying a cache partition of an NVM based on the LOD of access pattern. In some examples, the controller 108 may use the dynamic cache partition control block 130 and/or FTL 109 to perform this process to modify and/or resize the cache partition of the NVM 114. In some examples, the process 500 may be performed by the dynamic cache partition control block 130 and/or FTL 109 at blocks 204 and 206 of FIG. 3 to dynamically configure data storage cells of the NVM into a cache partition and a storage partition based on the detected LOD.

In one example, the host 102 may send read and/or write commands to the SSD controller 108 via the host interface 106. The controller 108 generates a corresponding access pattern to the NVM 114 via the NVM interface 112 based on the host's commands. At block 502, the controller may monitor the access pattern of the NVM to identify the LOD. The LOD corresponds to a certain LBA range. Once the LOD is determined, the controller may convert some QLC type storage to SLC type storage as the cache partition to improve performance and endurance of the NVM. Therefore, at decision block 504, the controller determines whether or not the available storage capacity (i.e., storage not used for storing valid data) of the NVM is sufficient for QLC-to-SLC conversion. If the NVM does not have sufficient storage capacity for QLC-to-SLC conversion, the controller may forgo modifying or creating the cache partition.

At block 506, if sufficient storage capacity is available, the controller may modify the cache partition size and the storage partition size based on the LOD of the access pattern. In one example, if the LOD has a size of X GB, and the storage partition has available QLC type storage that can be converted to SLC type storage of X GB, then the controller may convert that amount of QLC type storage to SLC type storage to make the cache partition as large as the LOD in size. After resizing the cache partition, the controller may use the address translator 116 to update the translation or mapping between logical and physical addresses such that future access of the LBAs in the LOD will be directed to the cache partition. For example, when new data is written to the NVM, the controller writes the new data to the cache partition if the LBA of the data falls in the LOD, and the corresponding old data in the QLC partition is erased. Therefore, more and more data in the LOD will move to the cache partition when the data is updated. In some examples, when the cache partition becomes full, the controller may move older data in the cache partition to the QLC partition such that new data can be written to the cache partition.

Figure 7:
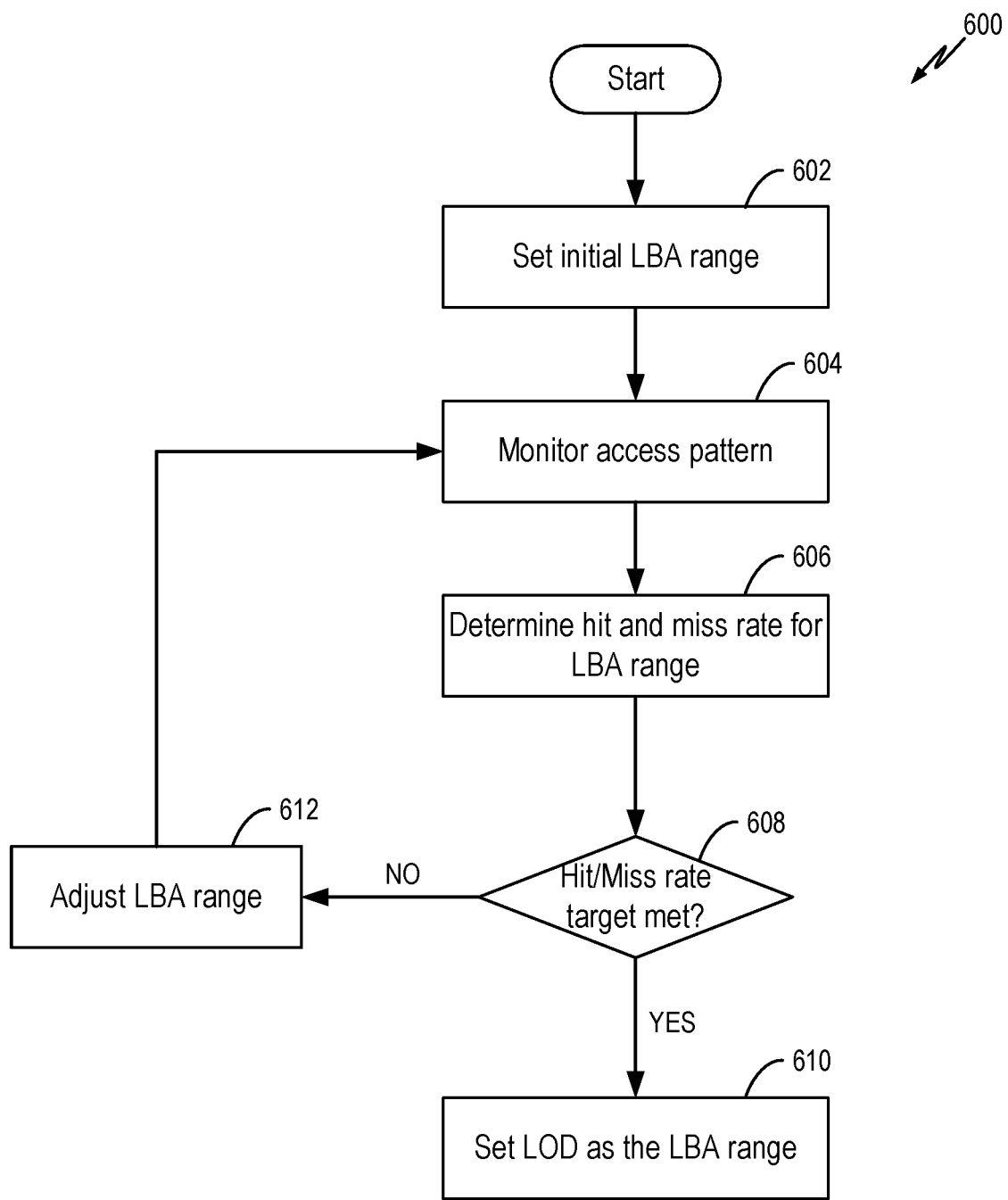
FIG. 7 is a flow chart illustrating a process for determining a LOD of an access pattern to an SSD.

FIG. 7 is a flow chart illustrating a process 600 for determining a locality of data (LOD) of an access pattern to an SSD. For example, the NVM controller 108 and/or dynamic cache partition control block 130 may perform this process 600 to determine the LOD of a certain access pattern by the host 102. Referring to FIG. 7, at block 602, the controller 108 may set an initial LBA range based on past access pattern of the SSD. In some examples, the controller may not set the initial LBA range. Moving on to block 604, the controller 108 monitors ongoing access pattern of the NVM. At block 606, based on the access pattern, the controller 108 may determine the hit/miss rate for the current LBA range over a predetermined time period. The hit/miss rate indicates the number of times that an NVM access falls within or out the current LBA range. Therefore, a higher hit/miss rate means that a higher percentage of NVM access falls within the current LBA range. In some examples, the controller 108 may use the dynamic cache partition control block 130 to keep track of the hit/miss rate of the access pattern.

At decision block, 608, the controller 108 determines whether or not the hit/miss rate meets a target rate or predetermined rate. For example, the target rate may be that 90 percent of the NVM access falls within the LBA range. In other examples, the target rate may be set to any desired values. If the hit/miss rate meets the target rate, the process continues to (YES branch of block 608) block 610; otherwise, the process continues (NO branch of block 608) to block 612.

At block 610, the controller 108 may set the LOD to be the LBA range that has been determined to meet the desired hit/miss rate. For example, if the LBA range is 10 GB, the LOD may be set to a 10 GB or larger range including the LBA range. However, if the target hit/miss rate target is not met, at block 612, the controller 108 may adjust the LBA range. For example, the controller 108 may increase the LBA range to include the LBA(s) recently accessed by the host 102. In one example, if the current LBA range covers the range 0x000 to 0x100 and the LBA 0x102 is recently accessed by the host (i.e., miss), the controller may extend the LBA range to include the address 0x102.

The controller may perform this process 600 iteratively until the LBA range has the desired hit/miss rate. That is, the process may be repeated until the hit/miss rate target is met by the resulted LBA range. Then the LOD may be set to be the same or greater than the resulted LBA range. The controller may perform this process 600 periodically to update the LOD.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

In one configuration, the SSD 104 includes means for receiving commands from a host for performing data operations with the NVM; means for determining an access pattern of the NVM by the host; and means for dynamically configuring data storage cells of the NVM into a cache partition and a storage partition based a locality of data (LOD) of the access pattern. The data storage cells of the storage partition may be configured to use more threshold voltages per cell for storing data than the data storage cells of the cache partition. The NVM controller 108, possibly in conjunction with the host interface 106, may be the means for receiving commands from a host for performing data operations with the NVM 114. The NVM controller 108 (e.g., dynamic cache partition control block 130) may be the means for determining an access pattern of the NVM by the host. For example, the dynamic cache partition control block 130 has an access pattern determination circuitry 131 configured to determine an access pattern of the NVM device by a host. The dynamic cache partition control block 130 also has an NVM partition circuitry 133 that may be the means for dynamically configuring data storage cells of the NVM into a cache partition and a storage partition based a LOD of the access pattern, for example, according to the method described in FIG. 6.

The LOD determination circuitry 132 may be the means for determining the LOD corresponding to a LBA range accessed by the host during a predetermined time period, for example, according to the method described in FIG. 7. The NVM partition circuitry 133 may be the means for adjusting the cache partition to be no smaller than the LOD in size such that the cache partition accommodates a higher percentage of the data operations relative to the storage partition; and may be a means for limiting the size of the cache partition such that a provisioned capacity of the NVM is available to the host regardless of the size of the cache partition. In other aspects, the aforementioned means may be a circuit or any apparatus configured to perform the functions recited by the aforementioned means.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A solid state device (SSD) comprising:
a non-volatile memory (NVM), and
a controller operatively coupled to the NVM;
wherein the controller is configured to:
determine an access pattern of the NVM by a host;
determine a hit and miss (H/M) rate of a logical block address (LBA) range accessed by the host during a predetermined time period;
determine a locality of data (LOD) of the access pattern as the LBA when the H/M rate meets a target rate;
dynamically configure data storage cells of the NVM into a cache partition and a storage partition based on the LOD of the access pattern; and
adjust a size of the cache partition in response to a change of the LOD, wherein the data storage cells of the cache partition are configured to provide greater endurance than the data storage cells of the storage partition.

2. The SSD of claim 1,
wherein the data storage cells of the storage partition comprise quad-level cell (QLC) type cells, and
wherein the data storage cells of the cache partition comprise at least one of single-level cell (SLC) type cells or multi-level cell (MLC) type cells.

3. The SSD of claim 1, wherein the controller is further configured to:
to adjust the size of the cache partition in response to a change in size of the LOD.

4. The SSD of claim 3, wherein the controller is further configured to:
adjust the size of the cache partition to be no less than the size of the LOD.

5. The SSD of claim 1, wherein the data storage cells of the storage partition are configured to store a greater number of bits per cell than the data storage cells of the cache partition.

6. A method of operating a non-volatile memory (NVM) controller configured to communicate with an NVM, comprising:
receiving commands from a host for accessing the NVM;
determining an access pattern of the NVM by the host;
determining a hit and miss (H/M) rate of a logical block address (LBA) range accessed by the host during a predetermined time period;
determining a locality of data (LOD) of the access pattern as the LBA when the H/M rate meets a target rate; and
dynamically configuring data storage cells of the NVM into a cache partition and a storage partition based on the LOD of the access pattern, wherein the data storage cells of the cache partition are configured to provide higher performance than the data storage cells of the storage partition.

7. The method of claim 6, wherein the data storage cells of the cache partition are configured to provide greater endurance than the data storage cells of the storage partition.

8. The method of claim 6, wherein data storage cells of the storage partition are configured to store a greater number of bits per cell than the data storage cells of the cache partition.

9. The method of claim 6, wherein dynamically configuring the data storage cells comprises:
adjusting a size of the cache partition in response to a change in size of the LOD.

10. The method of claim 9, wherein adjusting the size of the cache partition comprises:
adjusting the size of the cache partition to be no less than the size of the LOD.

11. The method of claim 10, wherein adjusting the size of the cache partition further comprises:
limiting the size of the cache partition such that a provisioned capacity of the NVM is available to the host regardless of the size of the cache partition.

12. A non-volatile memory (NVM) comprising:
means for receiving commands from a host for performing data operations with the NVM;
means for determining an access pattern of the NVM by the host;
means for determining a locality of data (LOD) corresponding to a logical block address (LBA) range accessed by the host during a predetermined time period;
means for dynamically configuring data storage cells of the NVM into a cache partition and a storage partition based the LOD of the access pattern, wherein data storage cells of the storage partition are configured to use more threshold voltages per cell for storing data than the data storage cells of the cache partition;
means for adjusting the cache partition to be no smaller than the LOD in size such that the cache partition accommodates a higher percentage of the data operations relative to the storage partition; and means for limiting the size of the cache partition such that a provisioned capacity of the NVM is available to the host regardless of the size of the cache partition.

13. The NVM of claim 12, wherein data storage cells of the storage partition are configured to store a greater number of bits per cell than the data storage cells of the cache partition.

14. The NVM of claim 12, wherein the means for adjusting the cache partition is further configured to:

increase the size of the cache partition in response to a size increase of the LOD; and decrease the size of the cache partition in response to a size decrease of the LOD.

* * * * *